(12) United States Patent
Laherty et al.

(10) Patent No.: US 10,129,958 B2
(45) Date of Patent: Nov. 13, 2018

(54) LIGHT FIXTURE EMERGENCY POWER SYSTEM

(71) Applicant: Cisco Technology, Inc., San Jose, CA (US)

(72) Inventors: Matthew A. Laherty, Bloomington, IN (US); William MacGowan, Toronto (CA); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 1141 days.

(21) Appl. No.: 14/447,937

(22) Filed: Jul. 31, 2014

(65) Prior Publication Data

US 2016/0036268 A1    Feb. 4, 2016

(51) Int. Cl.
| | |
|---|---|
| *H02J 9/02* | (2006.01) |
| *H05B 37/02* | (2006.01) |
| *H02J 7/00* | (2006.01) |
| *H02J 9/06* | (2006.01) |
| *H05B 33/08* | (2006.01) |

(52) U.S. Cl.
CPC ........ *H05B 37/0254* (2013.01); *H02J 7/0068* (2013.01); *H02J 9/065* (2013.01); *H05B 33/0842* (2013.01); *H05B 37/0227* (2013.01)

(58) Field of Classification Search
CPC .... H02J 7/0068; H02J 9/065; H05B 37/0254; H05B 33/0842; H05B 37/0227
USPC .......................................................... 307/19
See application file for complete search history.

(56) References Cited

U.S. PATENT DOCUMENTS

| | | |
|---|---|---|
| 8,255,487 B2 | 8/2012 | Valois |
| 8,334,901 B1 | 12/2012 | Garlick et al. |
| 8,352,769 B1 | 1/2013 | Ghose et al. |
| 8,432,438 B2 | 4/2013 | Ryan et al. |
| 8,436,896 B2 | 5/2013 | Staats et al. |
| 8,457,502 B2 | 6/2013 | Ryan et al. |
| 8,570,160 B2 | 11/2013 | Speegle et al. |

(Continued)

OTHER PUBLICATIONS

Cooper Lighting, "A Commercial Emergency Light," Product Selection Guide | Sixth Edition, retrieved from http://www.cooperindustries.com/content/dam/public/lighting/products/documents/atlite/spec_sheets/at-a-commercial-emergency-light-psgpage.pdf, on Jul. 30, 2014, 1 page.

(Continued)

*Primary Examiner* — Thienvu Tran
*Assistant Examiner* — Brian K Baxter
(74) *Attorney, Agent, or Firm* — Edell, Shapiro & Finnan, LLC

(57) ABSTRACT

Techniques are presented herein to operate a light fixture as in an emergency mode in order to verify that the light emitted by the light fixture when operated in the emergency mode complies with emergency operating policies, as well as to detect failures. The light emitted by the light fixture in emergency mode may be measured and adjusted to optimize the runtime of the light fixture in the emergency mode. The light fixture is connected to a lighting control system via a control network which supplies electrical power to charge an onboard battery of a light fixture and to operate the light fixture. The light fixture may be caused to operate in the emergency lighting mode when a main electrical power supply is interrupted or when performances of the light fixture and of the onboard battery are tested.

23 Claims, 7 Drawing Sheets

(56) References Cited

U.S. PATENT DOCUMENTS

| | | | |
|---|---|---|---|
| 8,588,809 B2 | 11/2013 | Seavey et al. | |
| 8,732,501 B1 | 5/2014 | Ghose et al. | |
| 8,745,429 B2 | 6/2014 | Ghose et al. | |
| 9,328,883 B1* | 5/2016 | Mangiaracina | H02J 7/0068 |
| 2004/0257789 A1* | 12/2004 | Nielson | F21S 9/022 |
| | | | 362/20 |
| 2012/0271477 A1* | 10/2012 | Okubo | H04L 12/10 |
| | | | 700/297 |
| 2012/0329474 A1 | 12/2012 | Seavey et al. | |
| 2013/0328402 A1* | 12/2013 | Noguchi | H02J 9/06 |
| | | | 307/66 |
| 2014/0035482 A1* | 2/2014 | Rains, Jr. | H05B 37/0254 |
| | | | 315/294 |
| 2014/0097758 A1* | 4/2014 | Recker | H05B 37/0272 |
| | | | 315/152 |
| 2014/0167621 A1* | 6/2014 | Trott | H05B 37/0218 |
| | | | 315/154 |
| 2015/0349586 A1* | 12/2015 | Rodriguez | H05B 37/0227 |
| | | | 307/23 |
| 2015/0359060 A1* | 12/2015 | Dack | H05B 33/0842 |
| | | | 307/22 |
| 2017/0047774 A1* | 2/2017 | Rezeanu | H02J 7/047 |

OTHER PUBLICATIONS

Laherty, "Light-as-a-Service: Why IT and Lighting Will Converge," Cisco Blog > Enterprise Networks, Jun. 29, 2012, retrieved from http://blogs.cisco.com/enterprise/light-as-a-service-why-it-and-lighting-will-converge/, on Jul. 30, 2014, 6 pages.

Castle, "NuLEDs Launches PoE Lighting Solution for LEDs," CEPro, Jun. 28, 2012, retrieved from http://www.cepro.com/article/nuleds_launches_poe_lighting_solution_for_leds/, on Jul. 30, 2014, 3 pages.

NuLEDs, "PoE LED Lighting How It Works," retrieved from http://www.nuleds.com/technology.html, on Jul. 30, 2014, 3 pages.

Primex Wireless, "SNS™ Emergency Lights," Product Data Sheet, retrieved from www.primexwireless.com/uploads/files/SNS_Emergency_Lights.pdf, on Jul. 30, 2014, 2 pages.

* cited by examiner

LIGHT FIXTURE EMERGENCY POWER SYSTEM

TECHNICAL FIELD

The present disclosure relates to control of an emergency light fixture.

BACKGROUND

Light fixtures in commercial buildings can be configured to serve as emergency light fixtures. Those light fixtures can be provided with energy-efficient and reliable light emitting diode (LED) arrays. It is possible to power and control the light fixtures operated in an emergency lighting mode as emergency light fixtures using Power-over-Ethernet (PoE), PoE Plus (PoE+), and Universal PoE (UPOE).

DESCRIPTION OF EXAMPLE EMBODIMENTS

Overview

Techniques are presented herein to operate a light fixture in an emergency lighting mode, to verify that the light emitted by the light fixture when operated in the emergency lighting mode complies with emergency operating policies, as well as to detect light fixture failures. The light emitted by the light fixture in the emergency lighting mode may be measured and adjusted to optimize a runtime of the light fixture in the emergency lighting mode.

The light fixture is connected to a lighting control system via a control network which supplies electrical power to charge an onboard battery of a light fixture and to control operation of the light fixture. A command transmitted from the lighting control system and/or a determination that the power supply is interrupted causes the light fixture to operate in an emergency lighting mode. The light fixture may be operated in the emergency lighting mode when a main electrical power supply is interrupted or when performance of the light fixture and of the onboard battery are being tested. Emergency lighting mode may differ from the normal lighting mode that is optionally supported by the same fixture in that emergency mode may use less energy to extend battery run time, and may also have specialized illumination patterns, for example to provide extra light on a stair well.

Example Embodiments

Building safety codes require unique light fixtures to support emergency lighting in commercial buildings. These fixtures provide emergency lighting in order to allow occupants to safely exit the building during a power failure or other emergency situation. Other examples of safety critical light fixtures are exit signs and certain warning signs that typically need to be powered from an uninterruptible power source for a certain period of time.

Figure 1:
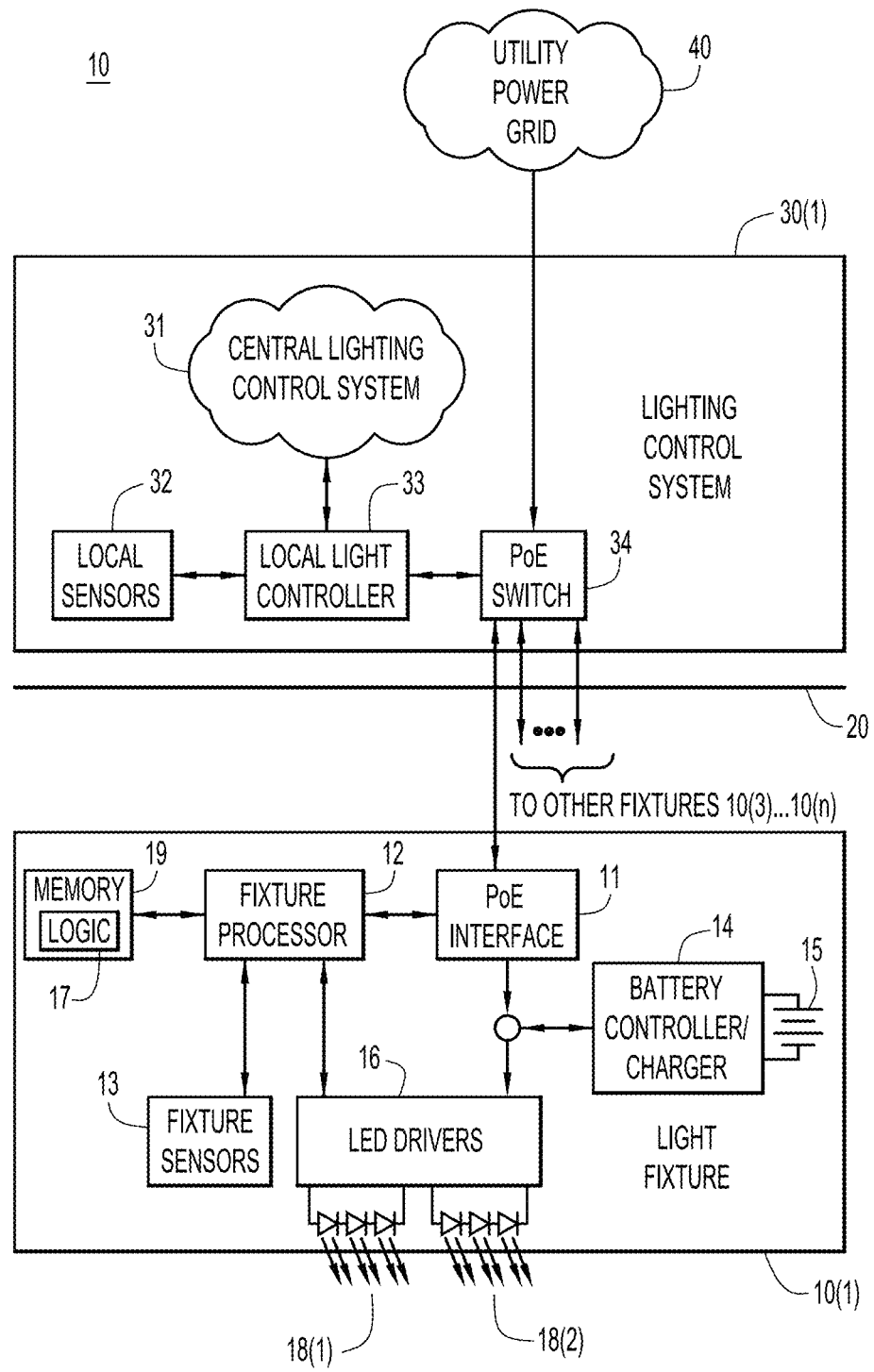
FIG. 1 is a block diagram of an emergency lighting system according to an example embodiment.

Referring first to FIG. 1, a system 10 is shown that includes light fixture 10(1), a control network 20, a lighting control system 30(1) and utility power grid 40. The lighting control system 30(1) includes central lighting control system 31, local sensors 32, local light controller 33, and Power-over-Ethernet (PoE) switch 34. The light fixture 10(1) is connected to Power-over-Ethernet (PoE) switch 34 via control network 20 and PoE interface 11. While a Power-over-Ethernet (PoE) switch is used in this example embodiment in the control network 20, the example embodiment is not limited to PoE. Instead, control network 20 may also be implemented using any other communication network that provides both power supply and data communication, such as, for example, a PoE Plus (PoE+) network, a Universal PoE (UPOE) network, and high power USB.

Light fixture 10(1) includes fixture processor 12, fixture sensors 13, battery controller/charger 14, onboard battery 15, LED drivers 16 and arrays of LED light emitters 18(1) and 18(2). Other light fixtures 10(3) . . . 10(n) (not shown) may also be connected to the lighting control system 30(1) via the control network 20.

Light fixture 10(1) includes memory 19. Memory 19 may comprise read only memory (ROM), random access memory (RAM), magnetic disk storage media devices, optical storage media devices, flash memory devices, electrical, optical, or other physical/tangible memory storage devices. The fixture processor 12 is, for example, a microprocessor or microcontroller that executes instructions for the light fixture logic 17.

Thus, in general, the memory 19 may include one or more tangible (non-transitory) computer readable storage media (e.g., a memory device) encoded with software comprising computer executable instructions for the light fixture logic 17, and when the software is executed (by the fixture processor 12) it is operable to perform the operations described herein in connection with the change of light settings to predetermined light settings, the control of the battery controller to supply power from the at least one onboard battery, and the control at least one array of LED emitters to emit light according to the predetermined light settings, for example.

Power is supplied to the light fixture 10(1) via the control network 20 from the PoE switch 34 of the lighting control system 30(1). The power is used to trickle charge onboard battery 15 which is controlled by battery controller/charger 14. Fixture processor 12 controls the operation of the light fixture 10(1). In particular, fixture processor 12 is programmed to determine whether the electrical power supplied from the PoE switch 34 is interrupted, to change light settings and to operate light fixture 10(1) in the emergency lighting mode. These settings are preselected/predetermined based upon the lighting plans of the building to insure adequate emergency lighting levels are achieved, while minimizing the energy use of the fixtures. They can be stored in central lighting control system 31 or in the fixture processors 12, preferably in non-volatile memory.

Fixture sensors 13 are provided to obtain a measure of an actual light level emitted by LED light emitters 18(1) and 18(2) which are driven by LED drivers 16.

Figure 2:
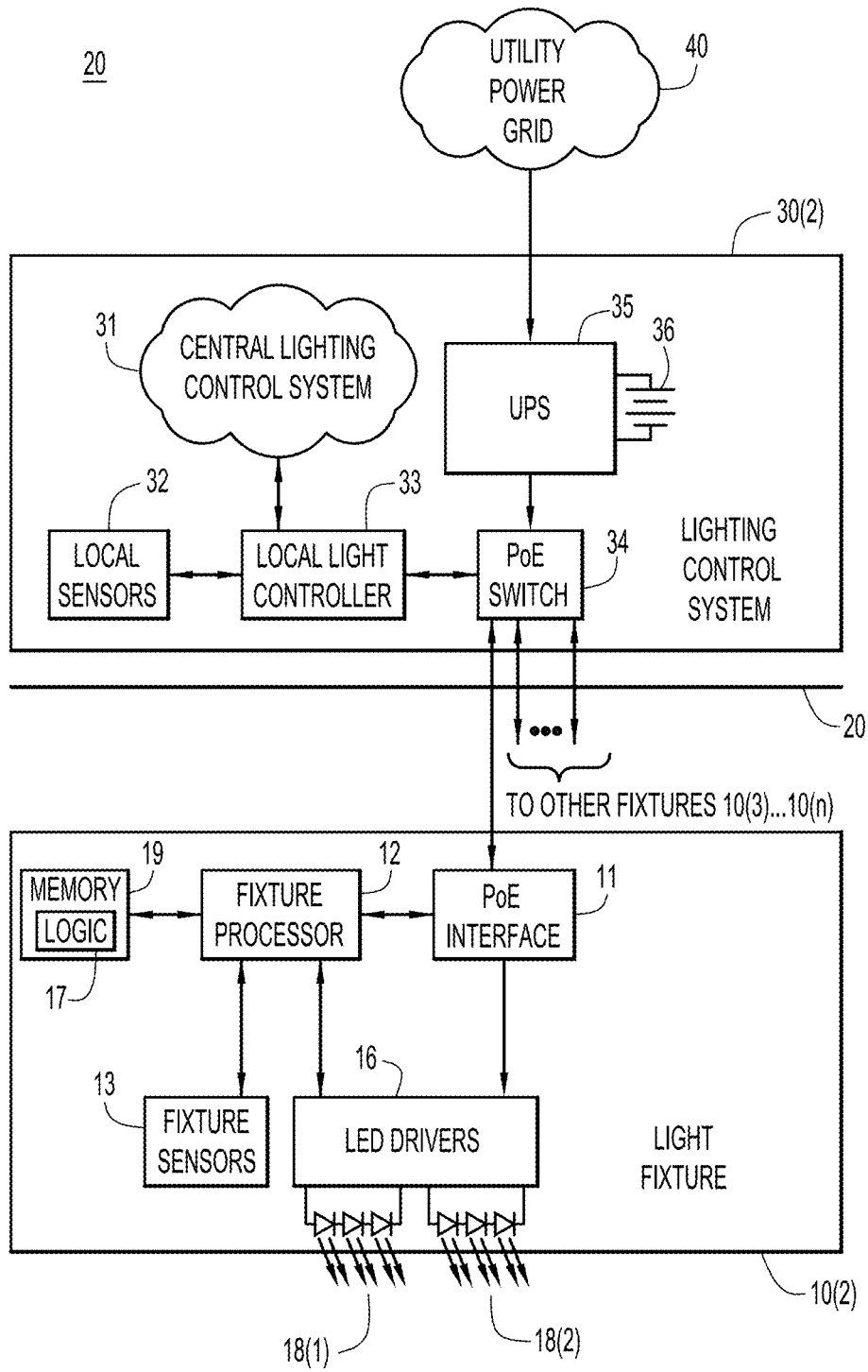
FIG. 2 is block diagram of an emergency lighting system according to another example embodiment.

FIG. 2 is block diagram of an emergency lighting system 10' according to another example embodiment. FIG. 2 is similar to FIG. 1, but shows light fixture 10(2) without an onboard battery. Instead, lighting control system 30(2) includes uninterruptable power system (UPS) 35 that includes battery 36. Battery 36 may be a large battery string, capable of operating a large array of lighting fixtures 10 over extended run times. UPS 35 supplies energy to the ports of the PoE switch 34 to power light fixture 10(2) when the main power supplied of utility power grid 40 fails.

UPS 35 that provides energy to the ports of the PoE switch 34 supplying power to the light fixtures via control network 20 may include large battery strings charged by a mains-operated rectifier, as is used in data centers and telecom wire centers. UPS 35 stores enough energy to operate all critical loads in a building for a designed runtime, and either directly distributes the battery voltage (typically 48V or 384 VDC), or uses an inverter to create protected AC circuits that run to the PoE switch 34.

UPS 35 may be implemented as a cabinet-level UPS (not shown) that is installed in the same equipment rack (not shown) as PoE switch 34. It is also possible to integrate UPS 35 in a modular PoE switch as a UPS linecard (not shown) or as an integrated battery.

According to an example embodiment, one 48 port PoE linecard is paired with one UPS linecard in the same modular chassis. The UPS linecard may include up to 120 batteries which would store enough energy to operate the 48 ports within a class II electrical range, for example at 15.4 W, 30 W, and 60 W. PoE output power for approximately three hours. To achieve higher runtimes or higher output power per port, more than one UPS board may be used per linecard. If shorter runtimes are allowable, for example when an emergency generator is available and less than a minute of battery time is required before it starts, multiple PoE linecards could share one UPS board.

In accordance with another example embodiment, each light fixture includes a fixture sensor 13, such as an ambient light sensor (photocell, photodiode, or even an inexpensive camera) with appropriate optics that can be calibrated to accurately measure the actual light levels achieved in the space immediately below the light fixture. This reading would be communicated back to the PoE switch 34 via the control network 20 can provide positive verification that the light fixture is working as expected.

In order to maximize the light fixture's run-time on the available energy stored in the emergency lighting system, a brightness of each light fixture can be regulated using closed-loop control between the fixture sensors 13 and the LED drivers 16 to provide exactly the minimum level of emergency illumination required by the relevant policies, building codes and regulations.

Figure 3:
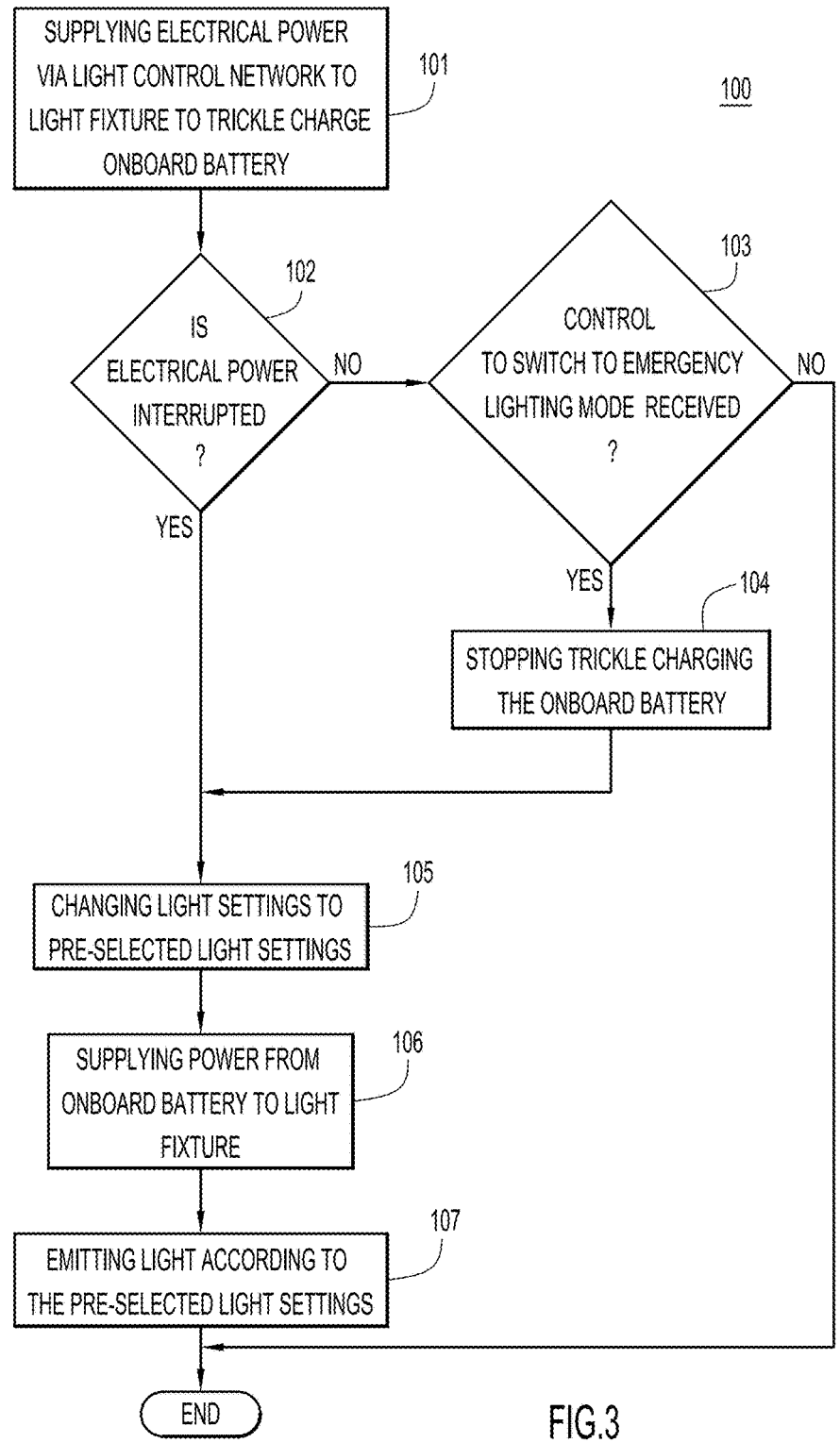
FIG. 3 is a flow chart depicting operations performed by the emergency lighting system, according to an example embodiment.
Figure 4:
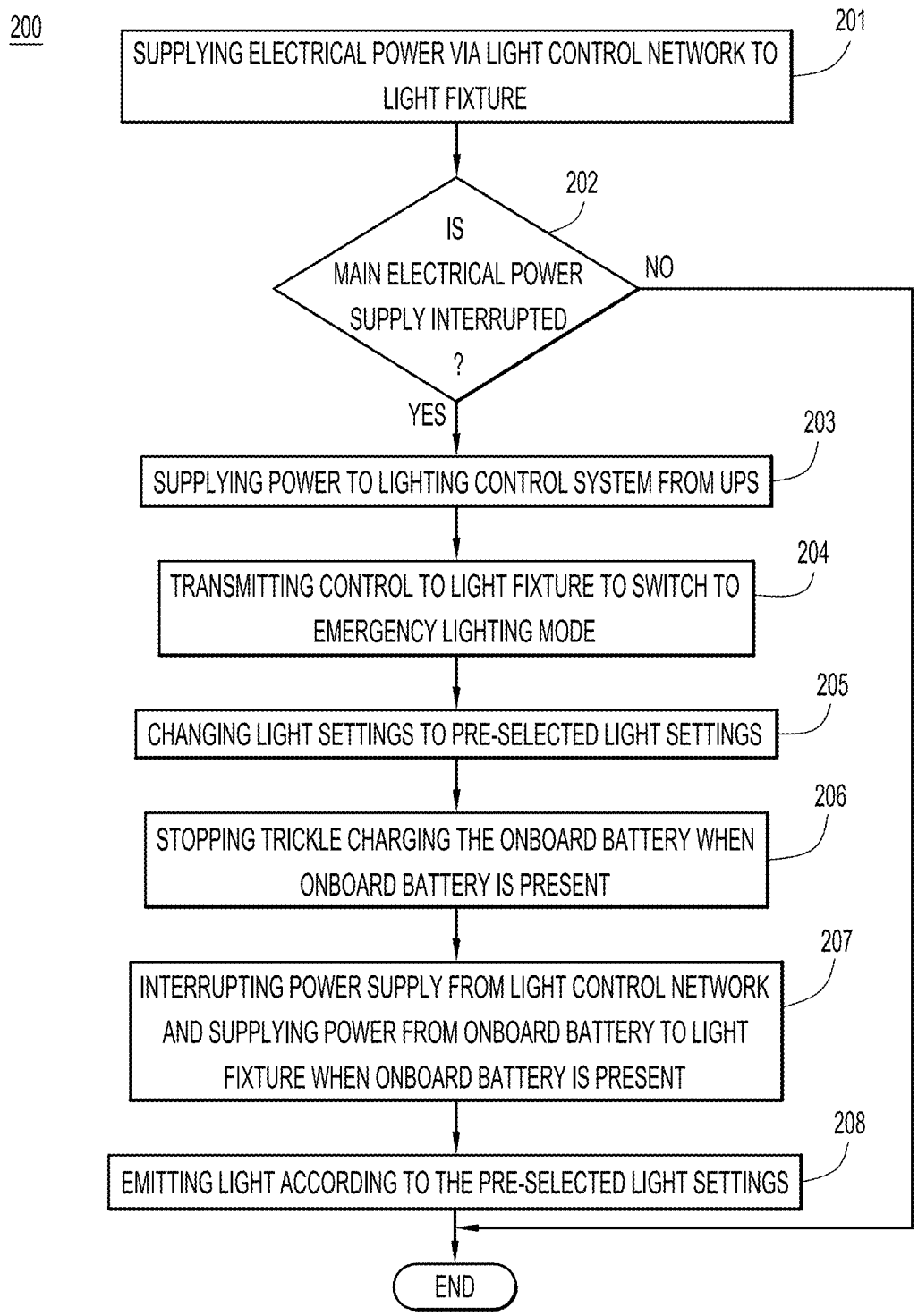
FIG. 4 is a flow chart depicting operations performed by the emergency lighting system, according to another example embodiment.
Figure 5:
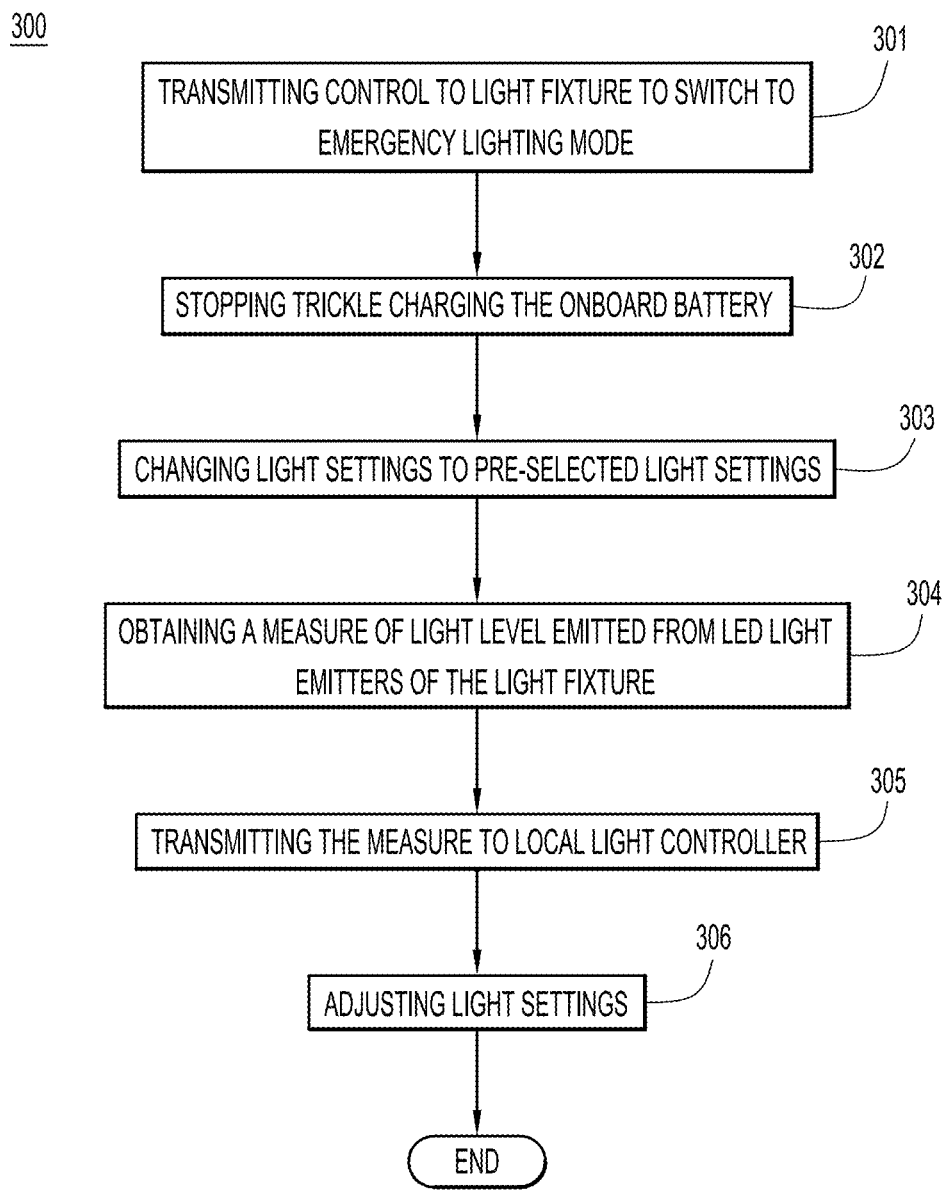
FIG. 5 is a flow chart depicting operations performed by the emergency lighting system, according to yet another example embodiment.

Reference is now made to FIGS. 3-5, which are flow charts depicting operations performed by the emergency lighting systems 30(1) and 30(2) and by the light fixtures 10(1) and 10(2) depicted in FIGS. 1 and 2.

In FIG. 3, a method 100 is shown for operating the light fixture 10(1) of FIG. 1. At 101, electrical power is provided via control network 20 to light fixture 10(1) to trickle charge onboard battery 15. At 102, fixture processor 12 determines whether the electrical power supplied via control network 20 is interrupted.

When fixture processor 12 determines that the electrical power supplied via control network 20 is interrupted, at 105, fixture processor 12 changes light settings to predetermined light settings. When fixture processor 12 determines that the electrical power supplied via control network 20 is not interrupted, at 103, fixture processor 12 determines whether a control to switch light fixture 10(1) to the emergency lighting mode is received from local light controller 33 of lighting control system 30(1). Upon determination that the control was received, at 104, fixture processor 12 controls battery controller/charger 14 to stop trickle charging onboard battery 15.

At 106, onboard battery 15 supplies power to light fixture 10(1) and at 107, LED light emitters 18(1) and 18(2) emit light according to the predetermined light settings.

In FIG. 4 illustrates operations of method 200 performed by lighting control system 30(2) and light fixture 10(2) depicted in FIG. 2. At 201, electrical power is provided via control network 20 to light fixture 10(1) which is operated in a normal operation mode. At 202, local light controller 33 determines that main electrical power supplied from utility power grid 40 is interrupted. When the main electrical power is interrupted, at 203, uninterruptable power system (UPS) 35 supplies power from battery 36 to lighting control system 30(2) which is further supplied to light fixture 10(2) via control network 20. At 204, local light controller 33 transmits a control to light fixture 10(2) requesting light fixture 10(2) to switch to the emergency lighting mode.

According to a further example embodiment, light fixture 10(2) of FIG. 2 may further include an onboard battery (not shown) similar to onboard battery 15 in FIG. 1. If light fixture 10(2) includes the onboard battery, at 206, trickle charging of the onboard battery is stopped by fixture processor 12. At 207, when the onboard battery is present, fixture processor 12 interrupts the power supply from the lighting control system and controls the onboard battery to supply power to light fixture 10(2).

Alternatively, when light fixture 10(2) includes the onboard battery, local light controller 33 may control PoE switch 34 to interrupt power supply from the lighting control system 30(2). In this case, similar to 102 in FIG. 3, fixture processor 12 may determine that the electrical power supplied via control network 20 is interrupted and may switch light fixture 10(2) to the emergency lighting mode based on the determination that the electrical power supplied via control network 20 is interrupted and power may be supplied from the onboard battery to the light fixture 10(2). At 208, light is emitted by LED light emitters 18(1) and 18(2) in accordance with the predetermined emergency lighting plan.

The decision whether to use power from onboard batteries of light fixtures 10(2)-10(n) or from uninterruptable power system (UPS) 35 to operate the light fixtures 10(2)-10(n) in the emergency lighting mode may be made by the central lighting control system 31 that may control local light controller 33 and fixture processor 12 such that it is possible to intelligently manage all power available in the entire system 10' in the event the main electrical power supplied from utility power grid 40 is interrupted. Said intelligent management is designed to maximize the run time of the emergency lighting services provided by system 10'.

According to yet another example embodiment, local light sensors 32 controlled by local light controller 33 can be used to adjust light settings of light fixtures 10(1)-10(n) to minimum levels of emergency illumination that comply with emergency operating policies.

FIG. 5 illustrates method 300 that includes operations of light control systems 30(1) and 30(2) and light fixtures 10(1) and 10(2) depicted in FIGS. 1 and 2 and that illustrates how light levels and illumination patterns emitted from LED light emitters 18(1) and 18(2) of light fixtures 10(1) and 10(2) are adjusted. At 301, a control is submitted from local light controller 33 to fixture processor 12 requesting the light fixtures 10(1), 10(2) to switch to the emergency lighting mode. At 302, fixture processor 12 controls battery controller/charger 14 of light fixture 10(1) (or optional battery controller/charger of light fixture 10(2)—not shown) to stop trickle charging onboard battery 15 (or optional onboard battery of light fixture 10(2)—not shown).

At 303, fixture processor 12 changes the light settings to the predetermined/preselected light settings, and at 304, a measure of a light level emitted from LED light emitters 18(1) and 18(2) is obtained. The measure is transmitted to local light controller 33. At 306, light settings are adjusted to a minimum level of an emergency illumination in accordance with an emergency operating policy for the at least one light fixture 10(1), 10(2).

By using methods 100, 200 and 300 depicted in FIGS. 3-5, when a commercial building space is reconfigured, for example when hallways are rerouted, the emergency lights are simply reconfigured via the lighting control systems 30(1) and 30(2) without physically accessing the light fixtures. In other words, in the event of office space reconfiguration, light fixtures 10(1)-10(n) still retain all the operating characteristics of emergency lights, but they can be dynamically controlled. This approach is different from conventional lighting systems because it enables any light fixture in the network to act as an emergency light fixture.

Emergency light fixtures need to be periodically tested, often monthly, at least annually. Traditionally, light fixtures were manually enabled, and a maintenance worker or security guard walked the entire building to verify that all fixtures are functioning. Specifically, batteries distributed across large arrays (thousands in a big building) of emergency light fixtures are a maintenance concern. The battery float life is often 5-10 years depending upon battery chemistry, after which time they lose capacity or fail outright. In a conventional lighting system it is difficult to detect when a given battery is reaching the end of its useful life. Therefore, best practice is to proactively change all batteries well before they approach their end of life. The replacement battery and labor to refurbish each fixture may generate significant costs in the form of ongoing expense in a large building. There also can be a significant environmental impact of discarding thousands of batteries when perhaps 20% of their useful life, on average, remains.

Figure 6:
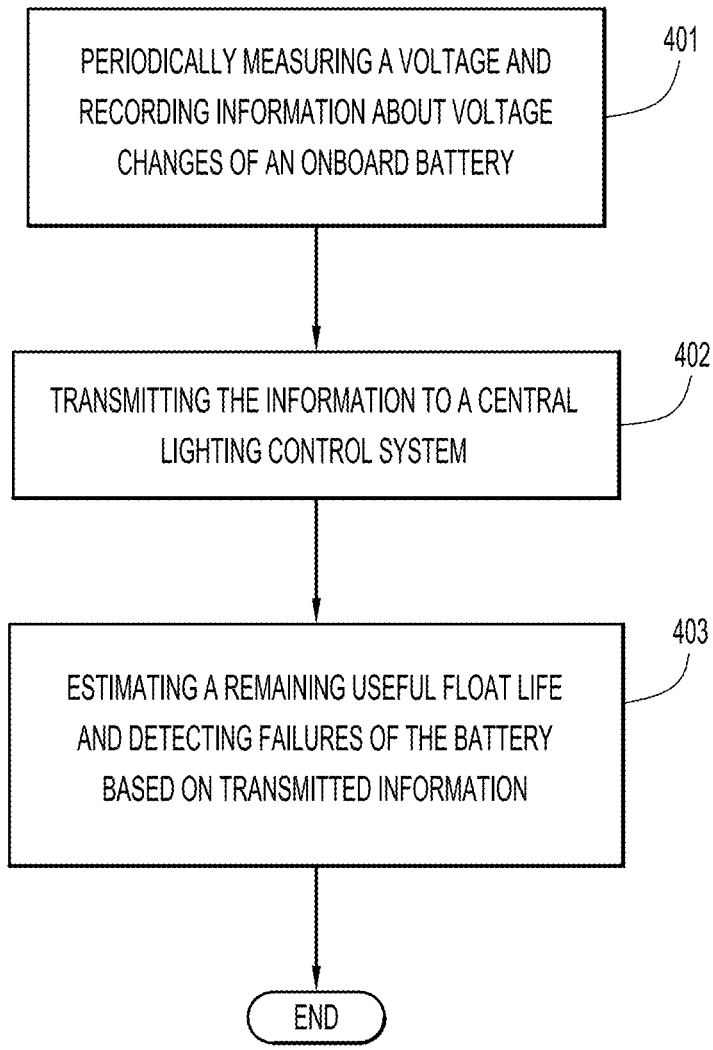
FIG. 6 is a flow chart depicting operations performed by the emergency lighting system to test an onboard battery of a light fixture according to an example embodiment.

FIG. 6 illustrates operations of method 400 to test onboard battery 15 of light fixture 10(1) in FIG. 1. At 401, a voltage of onboard battery 15 is repeatedly/periodically measured and a change in the voltage over time is recorded by fixture processor 12 to generate a discharge curve. This voltage change occurs as the fixture batteries 15 discharge into the active LED emitters 18(1) and 18(2) after their trickle charging has been disabled at steps 104, 206 or 302. At 402, the recorded information is transmitted to central lighting control system 31, and at 403, a remaining useful float life of onboard battery 15 is estimated based upon certain characteristics of the time vs. the battery voltage discharge curve recorded at 401. In addition, the central lighting control system 31 may detect a failure of the onboard battery 15 based on the recorded information. Once the testing phase is complete, central lighting control system 31 instructs all fixture processors 12 to reengage trickle charging of batteries 15 via battery controller/chargers 14.

Figure 7:
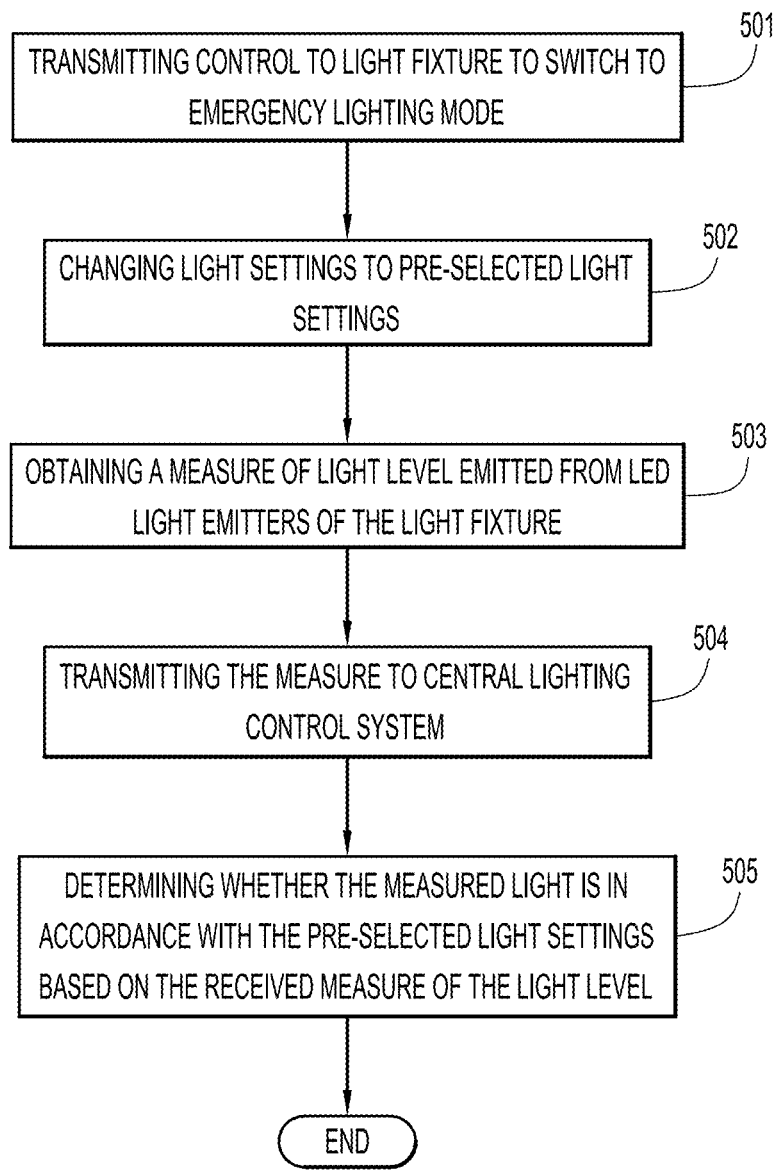
FIG. 7 is a flow chart depicting operations performed by the emergency lighting system to verify that a correct/desired lighting is achieved in response to an activation of an emergency lighting mode, according to an example embodiment.

FIG. 7 illustrates operations of a method 500 to verify that correct/desired lighting is achieved in response to the activation of the emergency lighting mode. At 501, in response to a request from the central lighting control system 31, a control is submitted/sent from local light controller 33 to fixture processor 12, the control requesting the light fixtures 10(1), 10(2) to switch to the emergency lighting mode. At 502, fixture processor 12 changes the light settings to the predetermined light settings, and at 503, a measure of a light level emitted from LED light emitters 18(1) and 18(2) is obtained by fixture sensor 13. At 504, the measure is sent to the central lighting control system 31, and at 505, the central lighting control system determines whether the measured light is in accordance with the predetermined light settings. This method allows the central lighting control system to verify that the correct/desired lighting is achieved when commanded.

The use of the above described methods results in lower installation and maintenance costs, longer runtime of the emergency lighting systems 10 and 10', more robust diagnostics, and easier reconfiguration. The use of the UPSs in conjunction with the PoE power distribution provides reliable emergency lights without the need for onboard batteries in the light fixtures such that any PoE lighting fixture can be designated an emergency light via a software command, which provides flexibility in reconfiguring lighting in commercial buildings.

The hybrid deployment model described in conjunction with FIG. 2 allows tradeoffs in the amount of reserve energy in the fixture batteries versus the central UPS in the lighting control system 30(2), to optimize network efficiency and cost.

Hierarchical deployment models, such as those illustrated in FIGS. 1 and 2, can cascade two or more levels of stored energy, for example in a building UPS, in or near the PoE switch 34, and in the light fixtures 10(1) and 10(2) themselves when the light fixtures include onboard batteries. Feedback of the actual emergency light levels as described for example in conjunction with FIGS. 5 and 6, and closed-loop control, provides the minimum illumination levels needed to comply with emergency operating policies, to save energy and to maximize battery runtime.

For example, when the energy of UPS 35 (of FIG. 2) is depleted, the lighting control system 30(2) would automatically switch to the onboard batteries (not shown) distributed inside the light fixtures 10(2) . . . 10(n), thereby achieving many additional hours of runtime. Using this hierarchical model, normal building operations can continue for the first several hours after a power outage using building UPS energy, followed by emergency lighting using energy from onboard batteries in the light fixtures for the remaining time duration required by regulations. The hierarchical model allows the energy reserves at each level to be optimally sized to maximize service runtime and minimize the cost of the batteries at all levels.

Test methods, such as method 400 illustrated in FIG. 6, allow periodic validation that all light fixtures operated in the emergency lighting mode are operating correctly without the need to manually observe all light fixtures in operation and battery replacement intervals may be increased.

In accordance with a further example embodiment, lighting control systems 30(1) and 30(2) may enable automated remote monthly testing and verification. For example, local light controller 33 may transmit a control to light fixture 10(1) such as the control described with regard to operation 103 in FIG. 3. In response to the control, fixture processor 12 may control LED light emitters 18(1) and 18(2) to emit light and battery controller/charger 14 to stop trickle charging onboard battery 15.

The switch port power telemetry of PoE switch 34 can be monitored to detect the increased current going out the port to which light fixture 10(1) is connected to confirm that the light fixture 10(1) is drawing power as expected as it is configured in its various modes and settings. Automatic verification that light fixture 10(1) is working can also be implemented in conjunction with local sensors 32, such as security cameras, fixture sensors 13, or other sensors covering an area containing the light fixtures 10(1) . . . 10(n).

A test algorithm running on local light controller 33 causes light fixtures 10(1) . . . 10(n) to operate in the emergency mode and observes a camera feed to insure the light comes on as expected. If no security camera is available, a technician or guard with a smartphone could be dispatched to each room, and an interactive test mode would sequentially configure each fixture for emergency mode, and use the technician's portable camera to observe its light output. An entire room of fixtures could thus be tested in only a few minutes.

In summary, Ethernet connectivity available to all light fixtures in the lighting control system permits sophisticated monitoring of the performance of the light fixtures and of the state of the onboard batteries. Periodically (monthly, for example) a subset of the light fixtures can be instructed to disable their charge circuit, and to emit light in an emergency lighting mode. Because the above-described methods increase reliability that all batteries have adequate standby capacity, this allows longer intervals between battery replacements and reducing the long-term costs of ownership of the emergency lighting network.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving, from a control network, electrical power configured to charge at least one onboard battery of at least one light fixture using the received electrical power, wherein the control network is a communication network that provides both electrical power supply and data communication;
causing the at least one light fixture to operate in an emergency lighting mode upon determining by a fixture processor that the received electrical power from the control network is interrupted;
causing the at least one light fixture to operate in the emergency lighting mode upon determining by the fixture processor that a control has been received from the control network to switch the at least one light fixture to the emergency lighting mode;
wherein a port of a Power over Ethernet (PoE) switch is connected to the control network and the at least one light fixture; and
wherein the received electrical power from the control network and the received control from the control network is provided to the at least one light fixture via the port of the PoE switch.

2. The method of claim 1, wherein the causing of the at least one light fixture to operate in the emergency lighting mode upon determining that the received electrical power from the control network is interrupted comprises:
changing light settings of the at least one light fixture to predetermined light settings; and
supplying power from the at least one onboard battery to the at least one light fixture to cause the at least one light fixture to emit light according to the predetermined light settings.

3. The method of claim 2, wherein the causing of the at least one light fixture to operate in the emergency lighting mode upon determining that the control is received from the control network to switch the at least one light fixture to the emergency lighting mode comprises:
terminating charging of the at least one onboard battery;
changing light settings of the at least one light fixture to predetermined light settings; and
supplying power from the at least one onboard battery to cause the at least one light fixture to emit light according to the predetermined light settings.

4. The method of claim 3, further comprising:
obtaining a measure of a light level emitted from the at least one light fixture by at least one fixture sensor of the at least one light fixture; and
adjusting the light settings of the at least one light fixture to a minimum level of an emergency illumination in accordance with an emergency operating policy for the at least one light fixture.

5. The method of claim 3, wherein the predetermined light settings to which the light settings of the at least one light fixture are set when operated in the emergency lighting mode comprise settings of at least one of a brightness, a color, or a radiation pattern to control the light emitted by the at least one light fixture such that the light emitted complies with emergency lighting regulations and is optimized to extend a runtime of the at least one light fixture in the emergency lighting mode.

6. The method of claim 1, wherein a lighting control system includes a local light controller in communication with the at least one light fixture via the control network, the method further comprising:
determining, at the local light controller, that a main electrical power supply is interrupted;
supplying power to the lighting control system from an uninterruptable power system;
transmitting a control to the at least one light fixture to switch the at least one light fixture to the emergency lighting mode; and
changing light settings of the at least one light fixture to predetermined light settings to cause the at least one light fixture to emit light according to the predetermined light settings.

7. The method of claim 6, further comprising:
terminating charging of the at least one onboard battery of the at least one light fixture; and
supplying power from the at least one onboard battery to the at least one light fixture.

8. The method of claim 6, further comprising:
obtaining, by a sensor, a measure of a light level emitted from the at least one light fixture;
sending the measure of the light level emitted to the local light controller of the lighting control system; and
adjusting the light settings of the at least one light fixture to a minimum level of an emergency illumination in accordance with an emergency operating policy for the at least one light fixture.

9. The method of claim 6, further comprising:
periodically measuring a voltage of the at least one onboard battery and recording information about voltage changes of the at least one onboard battery to generate a discharge curve;
sending the recorded information about voltage changes to a central lighting control system; and
analyzing the information about voltage changes in the central lighting control system by estimating a remaining useful float life of the at least one onboard battery and detecting failures of the at least one onboard battery.

10. The method of claim 6, further comprising:
obtaining a measure of a light level emitted from the at least one light fixture;
sending the measure of the light level to a central lighting control system; and
determining whether the measure of the light level is in accordance with the predetermined light settings.

11. The method of claim 1, further comprising determining whether an outgoing current of the port of the PoE switch changes to confirm that the at least one light fixture is operating in the emergency lighting mode.

12. A system comprising:
a lighting control system;
at least one light fixture connected to the lighting control system via a control network, wherein the control network is a communication network that provides both electrical power supply and data communication;
an uninterruptable power system to supply electrical power to the lighting control system;
a local light controller of the lighting control system to:
determine that a main electrical power supply is interrupted; and
send the control to the at least one light fixture to switch the at least one light fixture to the emergency lighting mode upon determination that the main electrical power supply is interrupted;
wherein the lighting control system supplies electrical power via the control network to the at least one light fixture to charge at least one onboard battery of the at least one light fixture, causes the at least one light fixture to operate in an emergency lighting mode upon an interruption of the electrical power, and causes the at least one light fixture to operate in the emergency lighting mode upon a control received from the control network to switch the at least one light fixture to the emergency lighting mode; and
wherein the lighting control system further comprises a Power over Ethernet (PoE) switch comprising a port to connect the at least one light fixture to the lighting control system via the control network;
wherein the electrical power supplied via the control network and the received control from the control network is provided to the at least one light fixture via the port of the PoE switch; and
wherein the local light controller determines whether an outgoing current of the port of the PoE switch changes to confirm that the at least one light fixture is operating in the emergency lighting mode.

13. The system of claim 12, further comprising:
a fixture processor to:
determine whether the electrical power supplied via the control network is interrupted;
upon determination that the electrical power supplied via the control network is interrupted, change light settings of the at least one light fixture to predetermined light settings, control a battery controller to supply power from the at least one onboard battery to the at least one light fixture, and control at least one array of light emitting diode (LED) emitters of the at least one light fixture to emit light according to the predetermined light settings.

14. The system of claim 13, wherein the fixture processor:
measures a voltage of the at least one onboard battery and records information about voltage changes of the at least one onboard battery; and
sends the recorded information about voltage changes to a central lighting control system;
wherein the central lighting control system analyzes the information about voltage changes to estimate a remaining useful float life of the at least one onboard battery and to detect failures of the at least one onboard battery.

15. The system of claim 13, wherein the fixture processor further:
upon determination that the electrical power supplied via the control network is uninterrupted, and upon receiving the control from the control network to switch the at least one light fixture to the emergency lighting mode, switches the at least one light fixture to the emergency lighting mode, terminates charging the at least one onboard battery, changes the light settings to the predetermined light settings, controls the battery controller to supply power from the at least one onboard battery to the at least one light fixture, and controls the at least one array of LED emitters to emit light according to the predetermined light settings.

16. The system of claim 13, wherein the predetermined light settings comprise settings of at least one of a brightness, a color, or a radiation pattern of the light emitted by the at least one array of LED emitters of the at least one light fixture that comply with emergency lighting regulations and that are optimized to extend a runtime of the onboard battery.

17. The system of claim 12, wherein the lighting control system further comprises at least one local sensor covering an area in which the at least one light fixture is installed to obtain a measure of a light level emitted from the at least one light fixture in response to a transmission of the control to the at least one light fixture.

18. The system of claim 12, wherein the at least one light fixture further comprises a sensor to obtain a measure of an actual light level emitted from a light emitting diode (LED) emitter of the at least one light fixture;
wherein the measure of the actual light level is sent to a local light controller of the lighting control system; and
wherein light settings of the LED emitter of the at least one light fixture are adjusted to a minimum level of an emergency illumination in accordance with an emergency operating policy for the at least one light fixture.

19. The system of claim 12, wherein the at least one light fixture further comprises a sensor to obtain a measure of a light level emitted by the at least one light fixture;
wherein the measure of the light level is sent to a central lighting control system; and
wherein the central lighting control system determines whether the measure of the light level is in accordance with predetermined light settings for the at least one light fixture.

20. One or more non-transitory computer readable storage media encoded with software comprising computer executable instructions and when executed by a processor, cause the processor to:

determine whether electrical power supplied via a control network is interrupted, wherein the control network is a communication network that provides both electrical power supply and data communication;

upon determination that the electrical power supplied via the control network is interrupted, cause at least one light fixture to operate in an emergency lighting mode, change light settings of the at least one light fixture to predetermined light settings, control a battery controller to supply power from at least one onboard battery to the at least one light fixture, and control at least one array of light emitting diode (LED) emitters of the at least one light fixture to emit light according to the predetermined light settings; and upon receiving a control from the control network to switch the at least one light fixture to the emergency lighting mode, switch the at least one light fixture to the emergency lighting mode, terminate charging the at least one onboard battery, change the light settings to the predetermined light settings, control the battery controller to supply power from the at least one onboard battery to the at least one light fixture, and control the at least one array of LED emitters to emit light according to the predetermined light settings; and wherein the electrical power supplied from the control network and the control received from the control network is provided via a port of a Power over Ethernet (PoE) switch that is connected to the control network and the at least one light fixture.

21. The non-transitory computer readable storage media of claim 20, and further comprising instructions that cause the processor to:

control a sensor to obtain a measure of a light level emitted from the at least one light fixture;

send the measure of the light level to a local light controller of a lighting control system; and adjust the light settings of the at least one array of LED emitters of the at least one light fixture to a minimum level of an emergency illumination in accordance with an emergency operating policy for the at least one light fixture.

22. The non-transitory computer readable storage media of claim 20, wherein the predetermined light settings to which the light settings of the at least one light fixture are set when operated in the emergency lighting mode comprise settings of at least one of a brightness, a color, or a radiation pattern to control the light emitted by the at least one light fixture such that the light emitted complies with emergency lighting regulations and is optimized to extend a runtime of the at least one light fixture in the emergency lighting mode.

23. The non-transitory computer readable storage media of claim 20, and further comprising instructions that cause the processor to:

obtain a measure of a light level emitted from the at least one light fixture;

send the measure of the light level to a central lighting control system; and determine whether the measure of the light level is in accordance with the predetermined light settings.

\* \* \* \* \*